Patented Apr. 21, 1925.

1,534,506

UNITED STATES PATENT OFFICE.

GUILLAUME DE MONTMOLLIN AND GÉRALD BONHÔTE, OF BASEL, SWITZERLAND, ASSIGNORS TO SOCIETY OF CHEMICAL INDUSTRY IN BASLE, OF BASEL, SWITZERLAND.

DYESTUFF.

No Drawing.  Application filed July 29, 1924. Serial No. 728,953.

*To all whom it may concern:*

Be it known that we GUILLAUME DE MONTMOLLIN and GÉRALD BONHÔTE, both citizens of the Swiss Confederation, and residing at Basel, Switzerland, have invented new and useful Dyestuffs, of which the following is a full, clear, and exact specification.

This invention relates to new dyestuffs, valuable for the production of fast tints on acetyl cellulose. It comprises the new dyestuffs as well as the material dyed with same.

It has been found that new dyestuffs are obtained by combining non-hydroxylated nitro-diazo compounds with aromatic monoamines of the benzenes series not derived from metanilic acid and substituted at their nitrogen atom by a residue containing a benzene nucleus, the two components being selected in such a way that only one contains a sulfonic group.

These dyestuffs correspond to the general formula:

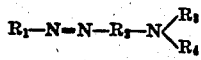

wherein $R_1$ represents a non-hydroxylated benzene nucleus carrying at least one nitro-group, $R_2$ a benzene nucleus not having any sulfonic group attached in ortho-position to the azo-bridge and carrying the

group in para-position to the azo-bridge, $R_3$ a residue containing a benzene nucleus, such as phenyl or benzyl residues, and $R_4$ hydrogen or alkyl, and in which only one of the residues $R_1$, $R_2$, $R_3$ contains one sulfonic group.

The new dyestuffs form orange to violet-blue and greenish-black powders, dissolving in water to yellow to brown and bluish-red solutions. They yield on acetyl cellulose, when dyed in a feebly acid or neutral bath, from yellow to bluish-red and brown tints of good fastness to washing and of good to very good fastness to light.

The following examples illustrate the invention.

Example 1.

183 parts of 2:4-dinitraniline are converted into the corresponding diazo-compound by introducing them into a solution of the calculated quantity of nitrosilsulfate in concentrated sulfuric acid and pouring the mixture on ice. The liquid of reaction is then poured, while stirring, into a solution of 313 parts of the sodium salt of N-ethyl-N-parasulfobenzylaniline $$C_6H_5 . N . C_2H_5 . CH_2 . C_6H_4 . SO_3Na$$

The formation of the dyestuff occurs very rapidly and as soon as the diazo-compound has disappeared, the dyestuff is filtered and dried. It forms a bronzy powder, dissolving in water to a bluish-red solution and dyeing acetyl cellulose in an acetic acid bath fast bluish-red tints.

The structural formula for the dyestuff is as follows:

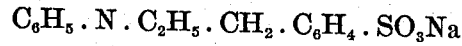
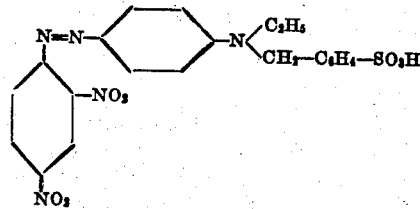

Example 2.

207 parts of 2:6-dichloro-4-nitraniline are converted into the corresponding diazo-compound by introducing them into a solution of the calculated quantity of nitrosyl-sulfate in concentrated sulfuric acid and pouring the mixture on ice. The liquid of reaction is introduced, while stirring, into a solution of 271 parts of diphenylaminsulfonate of sodium, whereby the formation of the dyestuff occurs immediately. Stirring is continued for some time, whereupon the mass is filtered and dried. The dyestuff forms a dark brown powder, dissolving in water to an orange solution and dyeing acetyl cellulose in an acetic acid bath orange tints of remarkable fastness to light.

Example 3.

240 parts of 2-nitraniline-4-sulfonate of sodium are diazotized as usual with 69 parts of sodium nitrite and 250 parts of hydrochloric acid. The solution of the diazo-compound is introduced, while stirring, into an alcoholic solution of 169 parts of diphenylamine and the dyestuff, which precipitates immediately, is filtered after some time and dried. It forms a dark powder, dissolving in water to an orange solution and dyeing acetyl cellulose in an acetic acid bath orange-red tints of remarkable fastness to light.

The following table shows the principal properties of some of the dyestuffs prepared according to the present invention.

| Diazotizing component. | Coupling component. | Aspect of the dyestuff powder. | Tint on acetyl-cellulose. |
|---|---|---|---|
| m-Nitraniline | Ethylbenzyl-aniline-sulfonic acid. | Orange | Yellow. |
| 2-chloro-4-nitraniline. | do | Violet-brown | Pink. |
| 2:4-Dinitraniline. | do | Blackish-violet | Bluish-red. |
| 2:6-Dichloro-4-nitraniline. | Diphenylaminesulfonic acid. | Brownish-black | Orange. |
| 4-Chloro-2-nitraniline. | Ethylbenzyl-aniline-sulfonic acid. | Reddish-brown | Do. |
| 4-Nitraniline-2-sulfonic acid. | Methyldiphenylamine. | Violet-brown | Reddish-brown. |
| 2-Nitraniline-4-sulfonic acid. | Diphenylamine. | Greenish-black | Orange-red. |
| 4-Nitraniline-3-sulfonic acid. | do | Yellowish-brown. | Do. |
| 2:4-Dinitraniline. | Benzylanilinesulfonic acid. | Gray-black | Reddish-brown. |
| m-Nitraniline | do | Yellow-orange | Yellow. |

What we claim is:

1. As new products the new dyestuffs of the general formula:

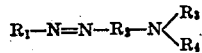

Wherein $R_1$ represents a non-hydroxylated benzene nucleus carrying at least one nitrogroup, $R_2$ a benzene nucleus not having any sulfonic group attached in ortho-position to the azo-bridge and carrying the

group in para-position to the azo-bridge, $R_3$ a residue containing a benzene nucleus, and $R_4$ hydrogen or alkyl, and in which only one of the reidues $R_1$, $R_2$, $R_3$ contains one sulfonic group, which dyestuffs form orange to violet-blue and greenish-black powders, dissolving in water to orange to brown and bluish-red solutions, and yielding on acetyl cellulose, when dyed in a feebly acid or neutral bath, from yellow to bluish-red and brown tints of good fastness to washing and of good to very good fastness to light.

2. As new products the new dyestuffs of the general formula:

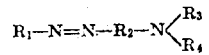

wherein $R_1$ represents a non-hydroxylated benzene nucleus carrying at least one nitrogroup, $R_2$ a benzene nucleus not having any sulfonic group attached in ortho-position to the azo-bridge and carrying the

group in para-position to the azo-bridge, $R_3$ a benzyl residue, and $R_4$ hydrogen or alkyl, and in which only one of the residues $R_1$, $R_2$, $R_3$ contains one sulfonic group, which dyestuffs form from yellowish-brown to blackish-violet and greenish-black powders, dissolving in water to orange to brown and bluish-red solutions, and yielding on acetyl cellulose, when dyed in a feebly acid or neutral bath from orange to bluish-red tints of good fastness to washing and of good to very good fastness to light.

3. As a new product the new dyestuff of the formula:

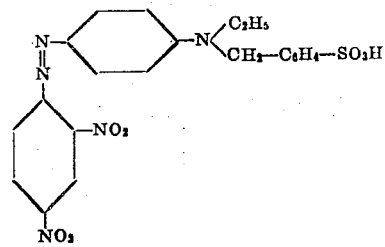

which forms a bronzy powder, dissolving in water to a bluish-red solution and yielding on acetyl cellulose, when dyed in an acetic acid bath, bluish-red tints of good fastness to washing and very good fastness to light.

4. The material dyed with the dyestuffs of claim 1.

5. The material dyed with the dyestuffs of claim 2.

6. The material dyed with the dyestuff of claim 3.

In witness whereof we have hereunto signed our names, this 14th day of July, 1924, in the presence of two subscribing witnesses.

GUILLAUME DE MONTMOLLIN.
GÉRALD BONHÔTE.

Witnesses:
MADELEINE SPENGLER,
AMAND BAUER.